United States Patent [19]

Yoneda

[11] 4,276,765
[45] Jul. 7, 1981

[54] PRESSING DEVICE FOR A HOSE COUPLER

[76] Inventor: Rikizo Yoneda, 64, Umenokimachi, Sakyoku, Kyoto-shi, Kyoto-fu, Japan

[21] Appl. No.: 48,653

[22] Filed: Jun. 14, 1979

[51] Int. Cl.³ .............................................. B21D 41/04
[52] U.S. Cl. ........................................ 72/402; 29/237; 72/416; 72/452
[58] Field of Search ................ 72/402, 409, 410, 412, 72/452, 453.15, 453.16, 399, 367, 416; 29/237, 243.52, 243.53, 243.54

[56] References Cited

U.S. PATENT DOCUMENTS

| 3,154,981 | 11/1964 | McDurmont | 81/301 |
| 3,792,603 | 2/1974 | Orain | 29/517 |
| 4,132,101 | 1/1979 | Abramson | 72/452 |

FOREIGN PATENT DOCUMENTS

| 677285 | 12/1963 | Canada | 72/402 |
| 1447123 | 7/1962 | France | 72/416 |
| 462341 | 3/1937 | United Kingdom | 72/412 |
| 402102 | 2/1974 | U.S.S.R. | 72/410 |
| 526978 | 10/1976 | U.S.S.R. | 72/410 |
| 573231 | 9/1977 | U.S.S.R. | 72/402 |

*Primary Examiner*—Ervin M. Combs
*Assistant Examiner*—Gene P. Crosby
*Attorney, Agent, or Firm*—Brisebois & Kruger

[57] ABSTRACT

This invention relates to a pressing device for a hose coupler in which the end of the hose is interposed between the inner and outer pipes of the hose coupler, and in which said external pipe is compressed by uniformly pressing gainst its outer periphery upper and lower dies and a pair of side dies so that the hose end can be secured between the internal and external pipes of the hose coupler.

6 Claims, 5 Drawing Figures

PRESSING DEVICE FOR A HOSE COUPLER

BRIEF SUMMARY OF THE INVENTION

In a fire-extinguishing hose the connecting portion between the hose and the coupler must have a strength large enough to withstand very high water pressures.

Conventionally, the fire-extinguishing hose and the coupler has been connected by inserting the coupler into the end of the hose and by winding a steel wire around the periphery of the hose end. This kind of connection between the hose and the coupler cannot perfectly withstand the high water pressure resulting in water leaks. Further, it is a troublesome work to fasten steel wires around the periphery of the hose end.

An object of this invention is to provide a pressing device for a hose coupler comprising a lower die on which the external pipe of the coupler is placed, an upper die vertically movable for pressing the external pipe, and a pair of side dies disposed between said upper and lower dies and movable toward the center of the external pipe by means of sliding slopes formed on the rear side of the side dies, said one pair of side dies being suspended from the upper die by the slotted suspension rod, whereby the end of the hose is secured between the external and internal pipes of the coupler by pressing said dies against the periphery of the external pipe so that the hose end is firmly secured to the hose coupler.

DETAILED DESCRIPTION OF THE INVENTION

Figure 3:
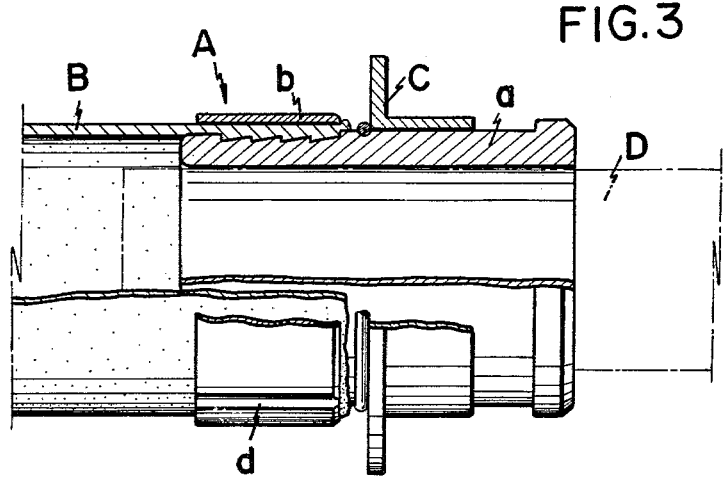
FIG. 3 is a partial cutaway view of the hose and the coupler, both being interconnected.

Referring to FIG. 3, a hose coupler (A) comprises an internal pipe (a) which constitutes a body of this coupler, an external pipe (b) that surrounds and compresses the peripheral surface of the end of a hose (B) connected with the internal pipe (a), and a coupling ring (C). The outer surface of the internal pipe (a) that engages with the hose (B) is provided with serrations to enable a firm connection with the hose (B).

An iron core (D) is inserted into the internal pipe (a) to prevent its deformation when the latter is subjected to compressive force through the external pipe (b).

Figure 1:
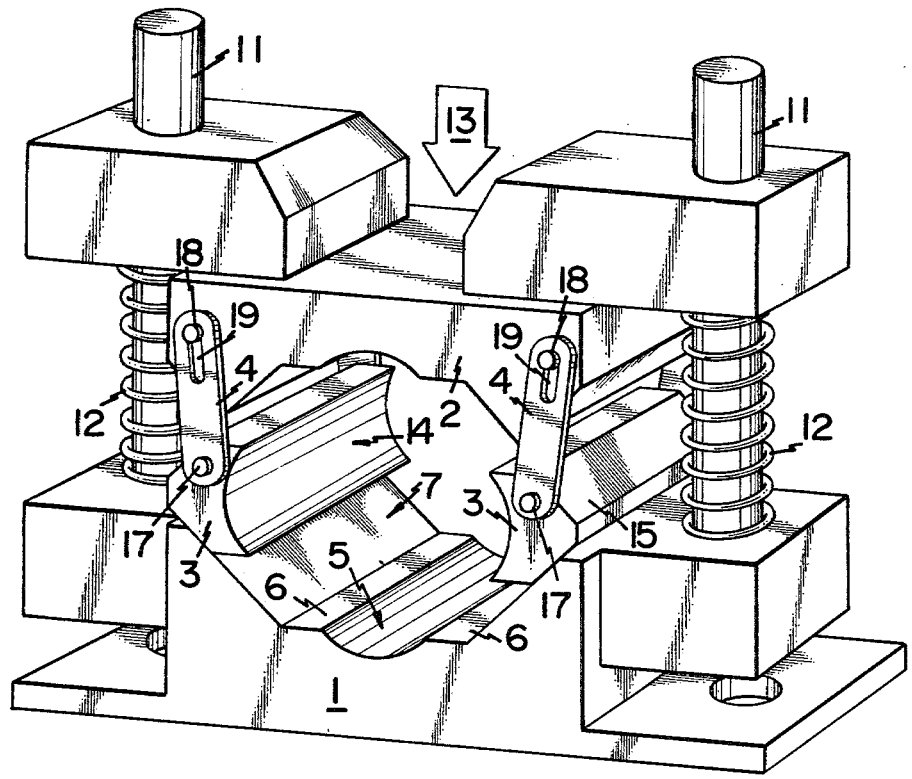
FIG. 1 is a perspective view of a pressing device for a hose coupler according to the invention.
Figure 2:
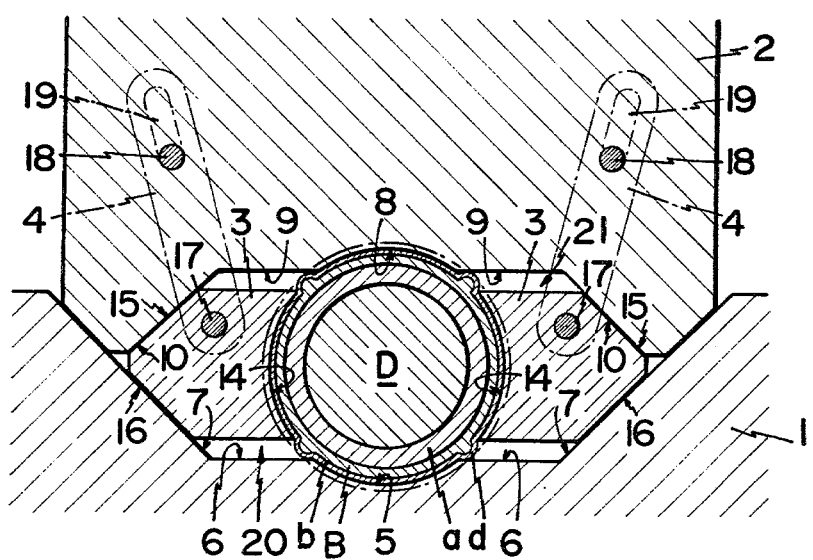
FIG. 2 is a cross-sectional view of the present device showing the connection between the hose and the coupler.

As shown in FIG. 1, a lower die (1) receives the external pipe (b) and has at the central portion a 90°-arc compression surface (5) with which the external pipe (b) is deformed. The lower die (1) is also provided on both sides with sliding slopes (7) with horizontal surfaces between the arc surface (5) and the sliding slopes (7). These sliding slopes have an inclination angle of about 45°.

There is an upper pressing element in the form of an upper die (2) which opposes the lower die (1) has a compression arc surface (8), horizontal surfaces (9) and sliding slopes (10), as does the lower die. The upper die (2) is also provided at either end with a guiding rod (11) and a compression spring (12) so that the upper die (2) can move vertically along the guide rod (11). The upper die (2) is always urged upwardly by the compression spring (12). The upper die (2) is forced downwardly by a hydraulic cylinder acting upon the upper central portion of the die (2) in a direction indicated by the arrow (13).

A pair of side dies (3) are disposed between the upper and lower dies (1), (2) and arranged symmetrically on the left- and right-hand side so as to face each other. Each side die (3) is provided on its front side with a 90°-arc compression surface (14) and on its rear side with upper and lower sliding slopes (15), (16).

When the upper die (2) moves down, the sliding slopes (15), (16) of the side die cooperate with the mating slopes (7) of the lower die (1) and with the slopes (10) of the upper die, respectively. And as further downward movement of the upper die proceeds, the side dies (3) are forced toward the center of the outer pipe (b) from both sides. Each of the side dies (3) is suspended from the upper die (2) by means of a pair of suspension rods (4) as well as pins (17), (18). A slot (19) is formed in the suspension rod (4) at one end to loosely receive either one of the pins (17), (18).

Between the side dies (3) and the upper and lower dies (1), (2) are formed gaps (20), (21) which constitute grooves for releasing corrugations (d), which are formed when the external pipe (b) is being pressed and deformed by these dies.

The operation of the pressing device for hose coupler with the above construction will now be described in detail.

As shown in FIG. 1, the upper die (2) is lifted by the compression spring (12), and the external pipe (b) is placed on the compression arc surface (5) of the lower die (1), with the internal pipe (a) and the hose (B) both being received at their ends into the external pipe (b).

When pressed downwardly as indicated by the arrow (13), the upper die (2) moves down along the guide rod (11) in opposition to the force of the compression spring (12) and the sliding slopes (16) of the side die (3) suspended from the upper die (2) by the suspension rod (4) cooperate with the mating slopes (7), causing the side dies (3) to move toward the center of the external pipe (b).

If, after the compression arc surfaces (14) of the side dies (3) have engaged with the peripheral surface of the external pipe (b) on both sides, the upper die (2) is subsequently lowered forcibly, the sliding slope (10) of the upper die (2) cooperates with the mating slope (15) of the side die (3), causing the compression arc surface (8) of the upper die (2) to engage with the peripheral surface of the external pipe (b).

And if the upper die (2) is further forced downwardly to a predetermined position, the upper and lower dies press the external pipe (b) held therebetween from the upper and lower sides, and the side dies (3) cooperating with the sliding slopes (7) and (10) also press the external pipe (b) from both sides.

In this way, the external pipe (b) is uniformly compressed from four directions by the upper and lower dies (2), (1) as well as the side dies (3) with the arc surfaces of these dies spaced 90° apart from each other, so that the external pipe (b) is deformed to have arcs with smaller curvature than before, with a result that the end of the hose (B) is uniformly and firmly held between the external pipe (b) and the internal pipe (a).

After the end of the hose (B) has been secured between the internal pipe (a) and the external pipe (b), the upper die (2) is released so that it will be lifted by the compression spring (12) and the side dies (3) will also be lifted along the slopes by means of the suspension rod (4), causing the side dies (3) to disengage from the external pipe (b). Then, the coupler (A) with the hose connected is drawn out of the pressing device.

Figure 5:
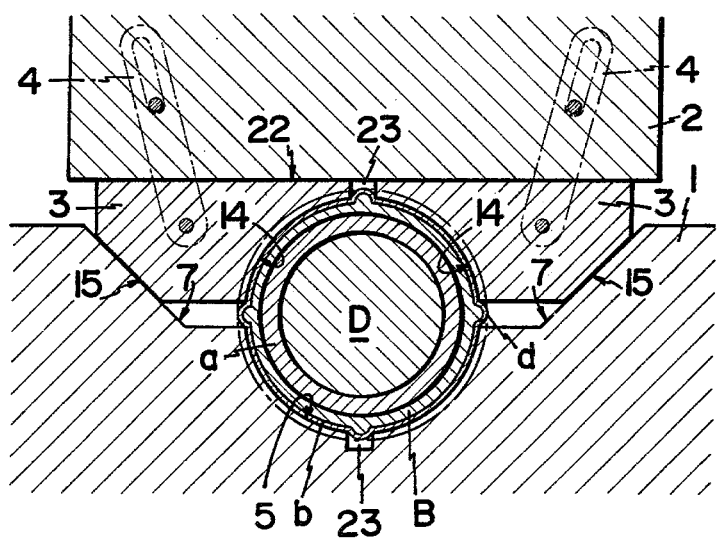
FIGS. 4 and 5 are cross-sectional views of other embodiments of the pressing device for a hose coupler.
Figure 4:
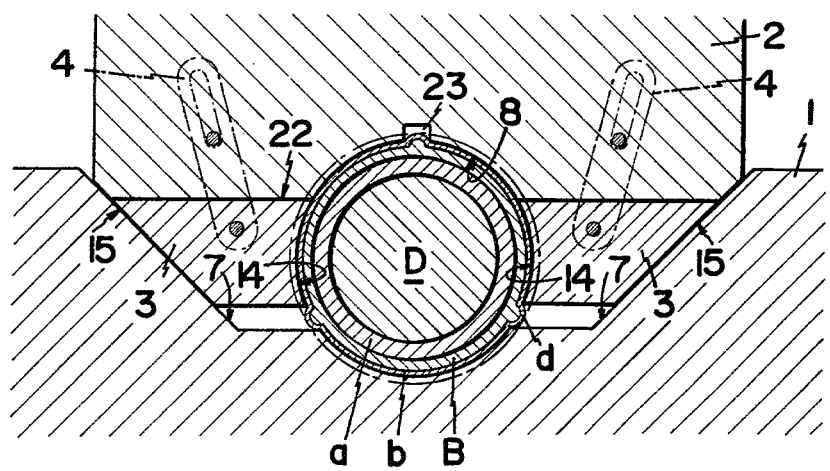

FIGS. 4 and 5 show other embodiments of the pressing device. In FIG. 4, the side dies (3) are provided at their rear ends with sliding slops (15) which engage with only the mating sliding slopes (7) of the lower die (1). The upper surface of each of the side dies (3) forms a horizontal, smooth sliding surface (22) for cooperating with the bottom surface of the upper die (2).

This horizontal sliding surface (22) is so formed that it abuts the bottom surface of the upper die (2) when the compression arc surface (14) of the side die engages with the peripheral surface of the external pipe (b).

The compression arc (8) of the upper die (2) is provided with a groove (23) for releasing the corrugated portion (d) formed due to the deformation of the external pipe (b).

In FIG. 5, the external pipe (b) is deformed by pressing against its periphery the compression arc surfaces (5) and (14) formed on the lower die (1) and the side dies (3), with the upper pressing element simply pressing the side dies (3) downwardly. The compression arc surface (5) of the lower die is so formed as to have an arc angle of about 180° or 120°, and for the compression arc surface (14) of the side dies (3), the arc angle is about 90° or 120°. The side dies (3) are each provided on their upper surface with a horizontal sliding surface (22) engageable with the bottom surface of the pressing element and, at the rear side, with a sliding slope (15) which engages only with the sliding slope (7) of the lower die (1).

With this pressing device of simple construction according to the invention, the external pipe (b) is compressed by pressing against its outer periphery the lower die (1), the upper die (2), and the side dies (3) suspended from the upper die (2) through the slotted suspension rods (4), so that the end of the hose can be secured firmly to the hose coupler.

I claim:

1. A hose coupler compressor comprising: a lower die on which an external pipe of said hose coupler is placed; an upper vertically movable pressing element; and a pair of side dies engageable by said pressing element and disposed between said lower die and said pressing element, and movable downwardly and inwardly toward the center of the external pipe by means of outwardly facing sloping side surfaces thereof cooperating with inwardly facing sloping surfaces fixed relative to said lower die; whereby upon downward movement of the pressing element the end of a hose is held between the internal and external pipes of a hose coupler, and said external pipe is pressed on its outer periphery and deformed by said dies so that the hose end is secured to the hose coupler; and means suspending each side die from said vertically movable pressing element for limited vertical and transverse movement relative to said vertically movable element so that said side dies separate laterally from the external pipe and are lifted upwardly during upward movement of the pressing element.

2. A hose coupler pressing device as set forth in claim 1, wherein said means for suspending said side dies from said pressing element comprises slotted suspension rods.

3. A pressing device according to claim 2, wherein said slotted rods are pinned respectively to said side dies and said pressing element with pins, the pins on the pressing element being laterally outwardly of the pins of the side dies.

4. A hose coupler pressing device as set forth in claim 1, wherein said upper pressing element comprises a die, and said upper, lower and side dies are each provided with an arcuate compressing surface with an arc angle of about 90°, and said side dies are each provided with both upper and lower outwardly facing sloping slide surfaces for cooperating with mating inwardly sloping surfaces of said lower and upper dies.

5. A pressing device for a hose coupler as set forth in claim 1, wherein said upper pressing element comprises a die, and said upper, lower and side dies are each provided with an arc angle of about 90°, and each of the side dies comprises a horizontal surface that slides along the bottom surface of the upper die.

6. A pressing device for a hose coupler as set forth in claim 1, wherein each of said side dies comprises a horizontal surface that slides along a bottom surface of the upper pressing element.

* * * * *